(12) United States Patent
Kojima et al.

(10) Patent No.: US 10,268,251 B2
(45) Date of Patent: Apr. 23, 2019

(54) MEMORY SYSTEM AND CONTROLLER

(71) Applicant: Toshiba Memory Corporation, Minato-ku, Tokyo (JP)

(72) Inventors: Yoshihisa Kojima, Kawasaki Kanagawa (JP); Katsuhiko Ueki, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/801,572

(22) Filed: Nov. 2, 2017

(65) Prior Publication Data

US 2018/0059755 A1     Mar. 1, 2018

Related U.S. Application Data

(63) Continuation of application No. 14/656,352, filed on Mar. 12, 2015, now Pat. No. 9,836,108.

(60) Provisional application No. 62/048,663, filed on Sep. 10, 2014.

(51) Int. Cl.
*G06F 1/00* (2006.01)
*G06F 1/26* (2006.01)
*G06F 12/02* (2006.01)

(52) U.S. Cl.
CPC .......... *G06F 1/263* (2013.01); *G06F 12/0246* (2013.01); *G06F 2212/205* (2013.01); *G06F 2212/2028* (2013.01)

(58) Field of Classification Search
None
See application file for complete search history.

(56) References Cited

U.S. PATENT DOCUMENTS

| 8,024,516 | B2 | 9/2011 | Miura |
| 8,838,539 | B1 | 9/2014 | Ashcraft et al. |
| 9,449,702 | B1 | 9/2016 | Pinkovich et al. |
| 2006/0209649 | A1 | 9/2006 | Vlutters et al. |
| 2007/0250737 | A1 | 10/2007 | Arulambalam et al. |
| 2010/0042773 | A1 | 2/2010 | Yeh |
| 2010/0306499 | A1 | 12/2010 | Petolino, Jr. |
| 2011/0058440 | A1 | 3/2011 | Smith et al. |
| 2011/0161784 | A1* | 6/2011 | Selinger .............. G06F 11/1068 714/768 |
| 2012/0066431 | A1 | 3/2012 | Bradford et al. |
| 2013/0007342 | A1 | 1/2013 | Inoue et al. |

(Continued)

FOREIGN PATENT DOCUMENTS

| JP | 2009-075759 A | 4/2009 |
| JP | 2012-078941 A | 4/2012 |

*Primary Examiner* — David Yi
*Assistant Examiner* — Craig S Goldschmidt
(74) *Attorney, Agent, or Firm* — White & Case LLP (57) ABSTRACT

In a memory system in an embodiment, in a case of normal operation, a control unit returns a write completion response upon completion of reception of write data from a host, and writes the write data into nonvolatile memory in a multiple values. In a case of unordinary power-off, changeover to operation using a backup battery is conducted and the control unit writes dirty data that is not completed in writing into the nonvolatile memory, into the nonvolatile memory with two values. When next boot, the control unit reads the dirty data from the nonvolatile memory into the volatile memory, and thereafter writes the dirty data into the nonvolatile memory in a multiple values.

20 Claims, 8 Drawing Sheets

(56) References Cited

U.S. PATENT DOCUMENTS

| | | |
|---|---|---|
| 2013/0067146 A1 | 3/2013 | Zettsu |
| 2013/0191578 A1* | 7/2013 | Goss .................. G06F 12/0804 |
| | | 711/102 |
| 2014/0059277 A1 | 2/2014 | Chung |
| 2014/0068313 A1 | 3/2014 | Shimpuku |
| 2014/0173357 A1 | 6/2014 | Anderson et al. |
| 2014/0304454 A1 | 10/2014 | Ellis et al. |

* cited by examiner

MEMORY SYSTEM AND CONTROLLER

CROSS-REFERENCE TO RELATED APPLICATIONS

This application is a continuation of application Ser. No. 14/656,352, filed Mar. 12, 2015 and is based upon and claims the benefit of priority from U.S. Provisional Application No. 62/048,663, filed on Sep. 10, 2014 the entire contents of which are incorporated herein by reference.

FIELD

Embodiments described herein relate generally to a memory system and a controller.

BACKGROUND

In general, in a memory system such as an SSD (Solid State Drive), write data requested to write by a host is written into nonvolatile memory. In the memory system at this time, the write data is written into the nonvolatile memory via volatile memory such as a buffer.

Even in a case where sudden power shut down has occurred, in such a memory system, it is necessary in some cases to store write data for which a response of write completion is given to a host, into nonvolatile memory. In the memory system, therefore, data in volatile memory is written into nonvolatile memory by using a backup battery.

In a case where large power is used at the time of writing, however, the backup battery becomes large in size and high in cost. Therefore, it is desired to reduce the size and cost of the backup battery by making write data nonvolatile with low power when sudden power shut down has occurred.

DETAILED DESCRIPTION

According to the present embodiment, a memory system is provided. The memory system includes a nonvolatile memory, a control unit, and a power supply circuit. Write data sent from a host is written into the nonvolatile memory. Furthermore, a volatile memory is disposed in the control unit to temporarily store the write data sent from the host. In addition, the control unit controls writing the write data into the nonvolatile memory. Furthermore, the power supply circuit provides with a backup battery to store power sent from an external power supply. In addition, the power supply circuit supplies the power sent from the external power supply to the nonvolatile memory and the control unit. In a case of normal operation in which power is normally supplied from the external power supply to the memory system, the control unit executes at least one cache operation and at least one host write operation. In the cache operation, the control unit returns a write completion response to the host upon completion of reception of the write data from the host asynchronously with completion of writing the write data into the nonvolatile memory. In the host write operation, the control unit writes the write data from the host received by the volatile memory into a first block in the nonvolatile memory in a multiple values. And in a case of unordinary power-off when power sent from the external power supply suddenly stops, the power supply circuit conducts changeover to operation using the backup battery. Furthermore, in a case of the unordinary power-off, the control unit writes first dirty data that is included in the write data in the volatile memory and that is not yet written and that is not completed in writing into the first block into a second block in the nonvolatile memory with two values. In addition, when next boot after the unordinary power-off has occurred, the control unit reads the first dirty data from the second block into the volatile memory. Thereafter, the control unit writes the first dirty data in the volatile memory into a third block in the nonvolatile memory in a multiple values.

Hereafter, a memory system and a controller according to an embodiment will be described in detail with reference to accompanying drawings. By the way, the present invention is not restricted by the embodiment.

Embodiment

Figure 1:
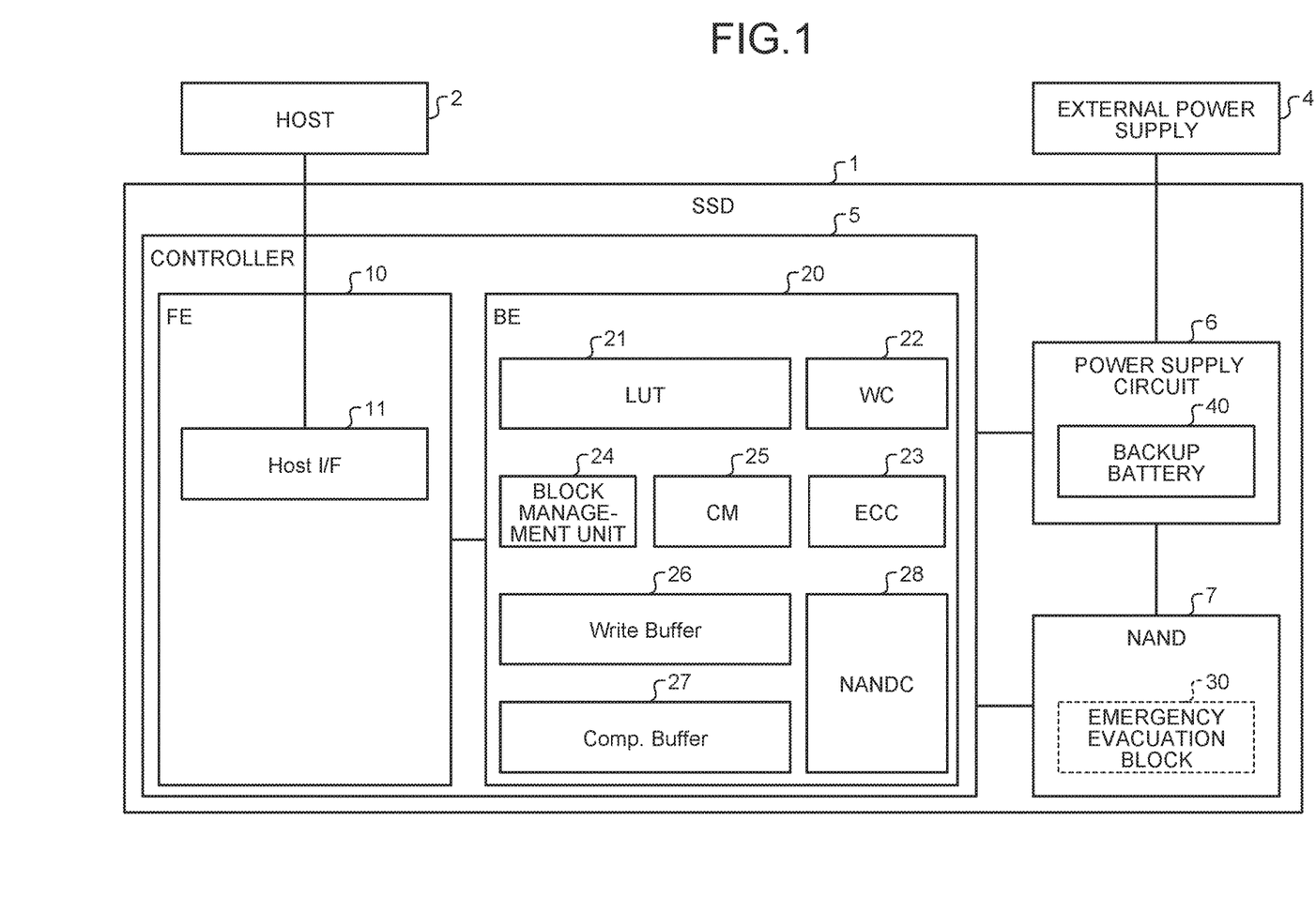
FIG. 1 is a diagram illustrating a configuration of a memory system according to an embodiment.

FIG. 1 is a diagram illustrating a configuration of a memory system according to an embodiment. In the present embodiment, a case where the memory system is an SSD (Solid State Drive) 1 will be described. In the SSD 1 in the present embodiment, a backup battery 40 is made small by reducing power required to conduct PLP (Power Loss data Protection) processing when sudden power shut down has occurred.

In the SSD 1 in the present embodiment, a dedicated block for emergency saving (emergency evacuation block 30) is prepared in a NAND 7. In a case where sudden power shut down has occurred, the SSD 1 writes data on volatile memory (write buffer 26) into the emergency evacuation block 30 by using power of the backup battery 40. In addition, the SSD 1 reads data in the emergency evacuation block 30 onto the volatile memory when next boot (next activation). And the SSD 1 writes the data on the volatile memory into a block assigned to host writing in the NAND 7. The assigned block (hereafter referred to as host write block) is a block to which a host 2 instructs a controller 5 to write the data.

The SSD 1 is connected to the host (host computer) 2 and an external power supply 4. Upon receiving a write command from the host 2, the SSD 1 executes write processing of write data (data storage) according to the write command. The SSD 1 includes the controller 5, a power supply circuit 6, and a NAND (NAND type flash memory) 7.

The controller 5 includes a semiconductor chip (SoC: System on a Chip) such as, for example, an LSI (Large-Scale Integrated circuit). The controller 5 controls data transfer between the host 2 and the NAND 7, and the like.

The controller 5 includes an FE (Frontend) 10 and a BE (Backend) 20. The FE 10 sends a write command and write data from the host 2, to the BE 20. The BE 20 temporarily stores write data, and writes the temporarily stored write data into the NAND 7.

The FE 10 includes a host I/F 11. Furthermore, the FE 10 includes a CPU (Central Processing Unit) (not illustrated). The CPU controls the FE 10. The host I/F 11 receives data (such as a write command and write data) sent from the host 2. Furthermore, the host I/F 11 transmits data (such as read data) to the host 2.

The BE 20 includes a LUT (Look up Table) 21, a WC (Write Controller) 22, an ECC (Error Correction Code) 23, a block management unit 24, a CM (Compaction Manager) 25, a write buffer 26, a comp. buffer 27, and a NANDC (NAND Controller) 28. Furthermore, the BE 20 includes a CPU (not illustrated), and the CPU controls the BE 20.

The LUT 21 is an address translation table used to conduct address translation between a logical address specified from the host 2 and a physical address in the NAND 7. In the LUT 21, a logical address and a physical address are associated with each other. The LUT 21 is referred to as FTL (Flash Translation Layer) table as well. When reading out data from the NAND 7, the ECC 23 corrects an error in data read out.

The write buffer 26 is volatile memory (a data write memory) that temporarily stores write data instructed to write by the host 2. The write buffer 26 is, for example, SRAM (Static Random Access Memory) and DRAM (Dynamic Random Access Memory).

Data stored in the write buffer 26 is written into the NAND 7 at predetermined timing. The WC 22 controls buffering processing of write data into the write buffer 26. If write data is sent from the host 2, the WC 22 causes write data to be stored temporarily in the write buffer 26. By the way, in the ensuing description, the write buffer 26 is referred to as WB 26 in some cases.

The comp. buffer 27 is a buffer in which data of compaction target is stored temporarily when executing compaction (referred to as garbage collection as well). The compaction is processing of disposing of unused pages in a block. Owing to execution of the compaction, scattered pages in use are collected into one physical block and empty blocks are secured. The CM 25 controls the compaction using the comp. buffer 27.

The block management unit 24 manages respective blocks in the NAND 7. The block management unit 24 sets an emergency evacuation block 30 in some block, for example, in the NAND 7. Furthermore, the block management unit 24 manages, for example, the number of free blocks, which are blocks into which data can be written. If the number of free blocks becomes insufficient, the block management unit 24 increases the number of free blocks by causing the CM 25 to execute compaction or the like. The NANDC 28 controls operation of the NAND 7. The NANDC 28 executes writing write data into the NAND 7 and reading data from the NAND 7.

The NAND 7 stores write data (user data) specified by the host 2, and stores management data (such as physical block management information) which will be described later. The emergency evacuation block 30 is set in the NAND 7. The emergency evacuation block 30 is a dedicated block used at the time of PLP processing executed when an unordinary power-off, which is sudden power shut downed, has occurred. The emergency saving block may be any block as long as the block can be used in the NAND 7. The block set to be the emergency evacuation block 30 is changed according to the use situation of the NAND 7. In the NAND 7, for example, data is erased by a block unit, and data is written and read by a page unit.

The power supply circuit 6 includes the backup battery 40. The power supply circuit 6 supplies power sent from the external power supply 4 to the controller 5 and the NAND 7. Furthermore, the power supply circuit 6 supplies power sent from the external power supply 4 to the backup battery 40. The backup battery 40 is, for example, a capacitor, a super capacitor, an electrolytic capacitor, a secondary battery, or the like.

The backup battery 40 stores power sent from the external power supply 4. When power sent from the external power supply 4 is stopped suddenly (in a case where sudden power shut down has occurred), the backup battery 40 supplies stored power to the controller 5 and the NAND 7. The case where sudden power shut down has occurred is, for example, a case where power sent from the external power supply 4 to the power supply circuit 6 is stopped at timing that is not intended by the user.

At the time of normal operation when power is supplied normally (when sudden power shut down does not occur), the SSD 1 is driven by the external power supply 4 in this way. In a case where stopped of the external power supply 4 is detected, changeover to drive using the backup battery 40 is conducted. The "power is supplied normally", for example, indicates a state in which the power to the extent that SSD1 can perform read/write data to the NAND7 in a region other than the emergency evacuation block 30 is supplied from the external power supply 4 in SSD1.

When transmitting a read command or a write command to the SSD 1, the host 2 specifies LBA (Logical Block Addressing) functioning as the logical address. The LBA is a logical address in which a serial number beginning with 0 is given to a sector.

Write data sent from the host 2 and received by the SSD 1 is developed on the write buffer 26 with a logical block managed by the host 2 taken as the unit. Then, as for write data in the write buffer 26, a cluster which is a conversion granularity of the LUT 21 is taken as a minimum unit. With a page which is an integer times the cluster taken as the unit, write data in the write buffer 26 is written into the NAND 7.

The SSD 1 in the present embodiment has a PLP function which is a protection function of write data. The PLP function is a function of ensuring persistence of write data for which a write completion response is given to the host 2 even in a case where sudden power shut down has occurred. In other words, the PLP function is a function of storing write data to prevent write data which has been written once when viewed from the host 2 from reverting even in a case where sudden power shut down has occurred.

Furthermore, in a stage in which write data is stored in the write buffer 26, the SSD 1 gives a write completion response to the host 2 before non-volatilization is completed, as a cache operation. Such a cache operation is high in write processing as compared with a cache off operation in which a write completion response is given after waiting for completion of a program to the NAND 7.

The SSD 1 in the present embodiment non-volatilizes dirty data (data not yet written) in the write buffer 26 by utilizing the backup battery 40 when sudden power shut down has occurred, in order to satisfy requirements of the PLP function. The dirty data is data required to be non-volatilized by the PLP function after sudden power shut down has occurred. By the way, in the ensuing description, dirty data in the write buffer 26 is referred to as WB dirty. The WB dirty is at least a portion of write data in the write buffer 26.

Figure 2:
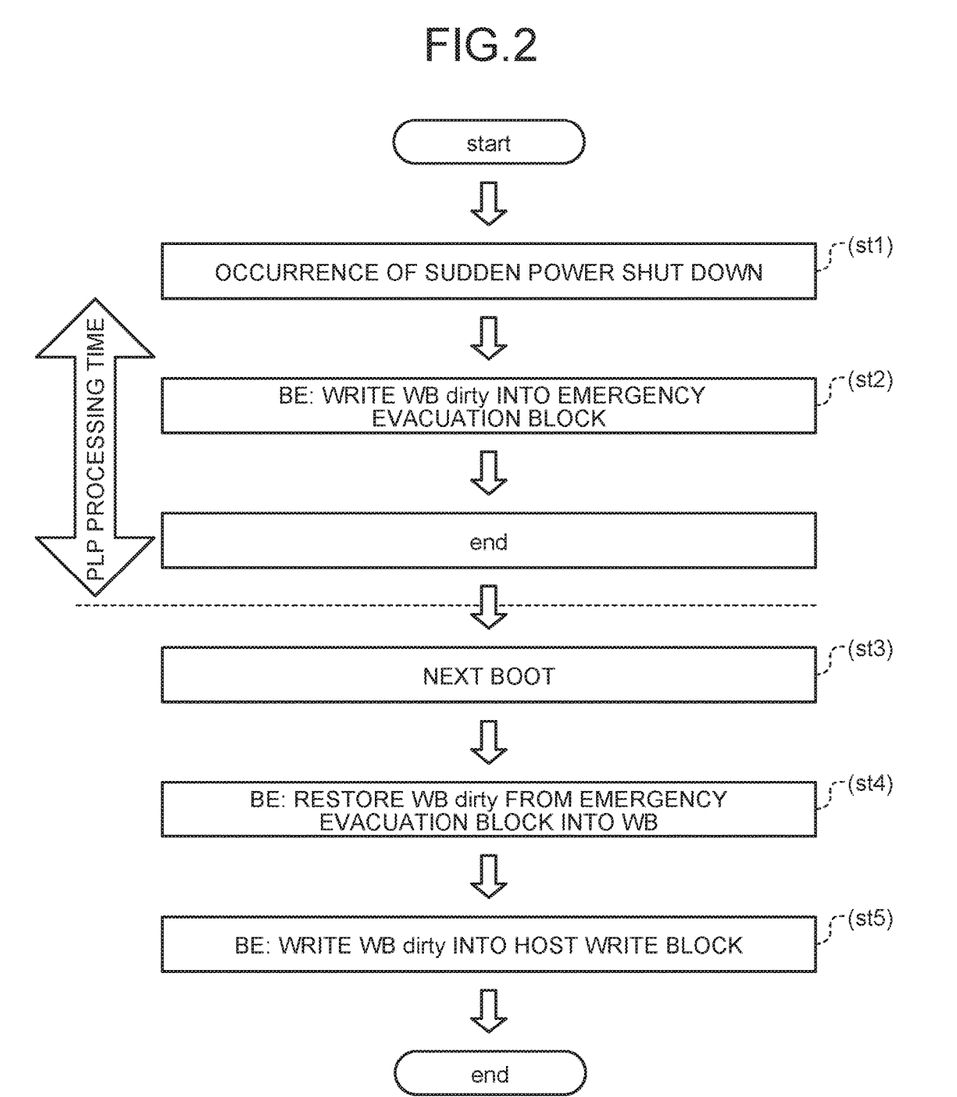
FIG. 2 is a diagram used to explain an operation processing procedure in a memory system according to an embodiment.

FIG. 2 is a diagram used to explain an operation processing procedure in the memory system according to the embodiment. An operation processing procedure in the SSD 1 in a case where sudden power shut down has occurred will be described with reference to FIG. 2. If sudden power shut down has occurred (st1), the BE 20 writes WB dirty, which is data not yet written into the NAND 7, into the emergency evacuation block 30 (st2). As a result, non-volatilization of the WB dirty is conducted. In the SSD 1, time elapsed until non-volatilization of the WB dirty is conducted since occurrence of the sudden power shut down is PLP processing time.

If next boot is executed in the SSD 1 after the sudden power shut down has occurred (st3), the BE 20 restores the WB dirty from the emergency evacuation block 30 to the WB 26. Specifically, the BE 20 reads the WB dirty from the emergency evacuation block 30 and writes the WB dirty into the write buffer (WB) 26 (st4).

In addition, the BE 20 writes the WB dirty in the write buffer 26 into a host write block in the NAND 7 (st5). As a result, the PLP function is implemented in the SSD 1.

In the present embodiment, the SSD 1 prepares the emergency evacuation block 30, which is a block dedicated to the PLP function, in the NAND 7 in this way. And the SSD 1 makes the WB dirty non-volatile by using the emergency evacuation block 30 only at the time of the PLP processing.

By the way, at the time of next boot which is the processing of st3, in addition, sudden power shut down occurs in some cases. In this case, the processing of st4 and st5 is executed when normal activating is conducted at the time of activating further next time or later.

Figure 3:
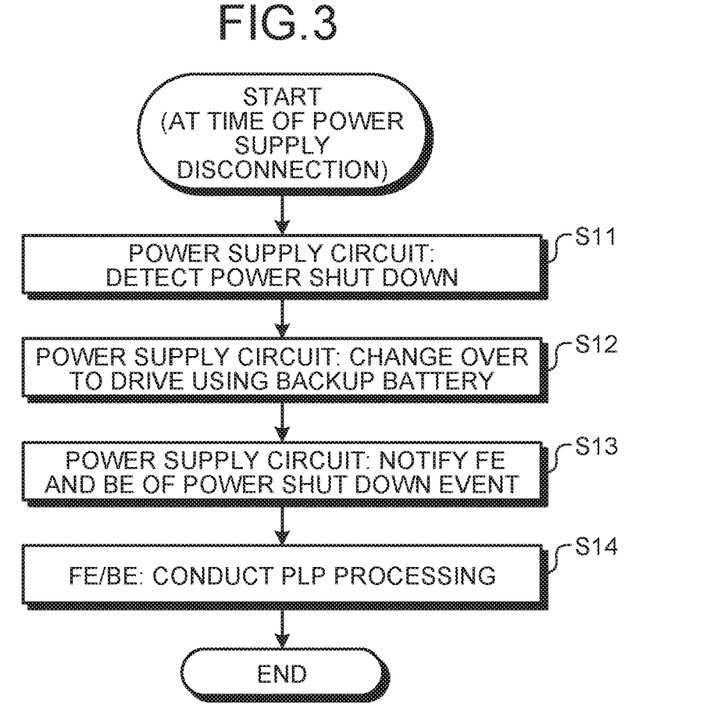
FIG. 3 is a flow chart illustrating a PLP processing procedure in a memory system according to an embodiment when sudden power shut down has occurred.

A processing flow at the time when sudden power shut down has occurred will now be described. FIG. 3 is a flow chart illustrating a PLP processing procedure in the memory system according to the embodiment when sudden power shut down has occurred. If sudden power shut down occurs, the power supply circuit 6 detects power shut down from the external power supply 4 (step S11). As a result, the power supply circuit 6 changes over to drive using the backup battery 40 (step S12).

And the power supply circuit 6 notifies the FE 10 and the BE 20 of a power shut down event which indicates that sudden power shut down has occurred (step S13). As a result, each of the FE 10 and the BE 20 executes PLP processing (step S14).

Figure 4:
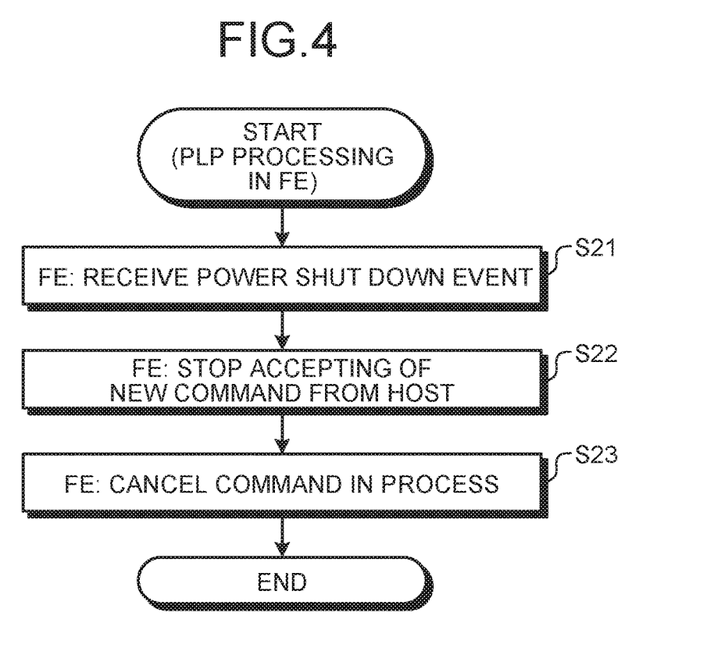
FIG. 4 is a flow chart illustrating a PLP processing procedure conducted by an FE in an embodiment.

Here, a processing procedure of the PLP processing conducted by the FE 10 will be described. FIG. 4 is a flow chart illustrating a PLP processing procedure conducted by the FE in the embodiment. Upon receiving the power shut down event (step S21), the FE 10 stops accepting a new command from the host 2 (step S22).

In addition, the FE 10 cancels a command in process (step S23). A command in process in the FE 10 is a command that is included in commands sent from the host 2 and that is not completed in processing in the BE 20. Therefore, the command in process in the FE 10 is a command for which the FE 10 does not give a completion response to the host 2.

For example, there is a case where sudden power shut down occurs after a write command is sent from the host 2 to the FE 10. If in this case writing of write data corresponding to the write command is not completed for the BE 20, the write command is a command in process and consequently the write command is canceled.

Figure 5:
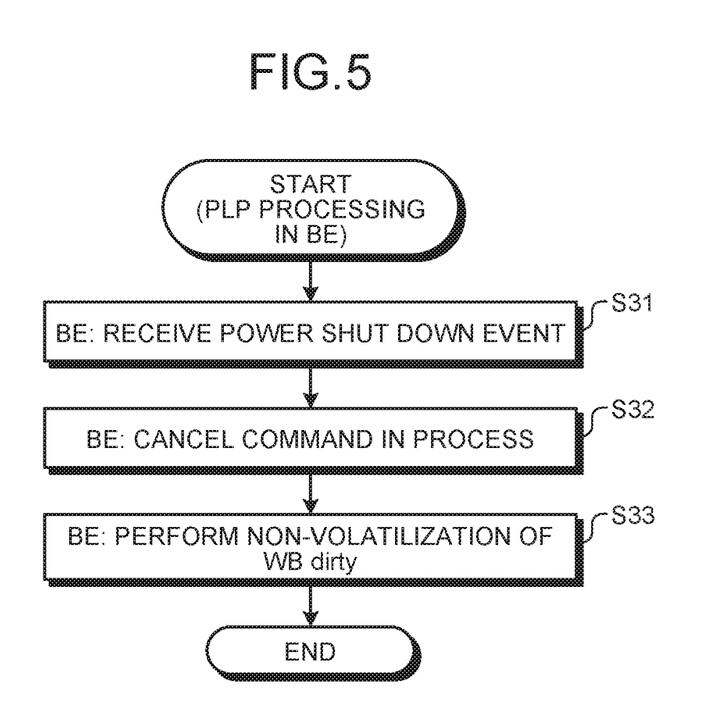
FIG. 5 is a flow chart illustrating a PLP processing procedure conducted by an BE in an embodiment.

A processing procedure of PLP processing conducted by the BE 20 will now be described. FIG. 5 is a flow chart illustrating a PLP processing procedure conducted by the BE in the embodiment. Upon receiving the power shut down event (step S31), the BE 20 cancels a command in process (step S32).

For example, in the BE 20, there is a case where sudden power shut down occurs after a write command is sent to the WC 22 to the NANDC 28. If in this case writing of write data corresponding to the write command is not completed for the NAND 7, the write command is a command in process and consequently the write command is canceled. By the way, in some cases, a portion of write data corresponding to a write command is non-volatilized and a remaining portion is not non-volatilized because of cancel. Even in this case, a completion response of the write command is not returned to the host 2, and consequently the cancel processing is permitted.

After the command in process is canceled, the BE 20 performs non-volatilization of the WB dirty (step S33). Specifically, the BE 20 writes the WB dirty in the write buffer 26 into the emergency evacuation block 30 in the NAND 7.

Figure 6:
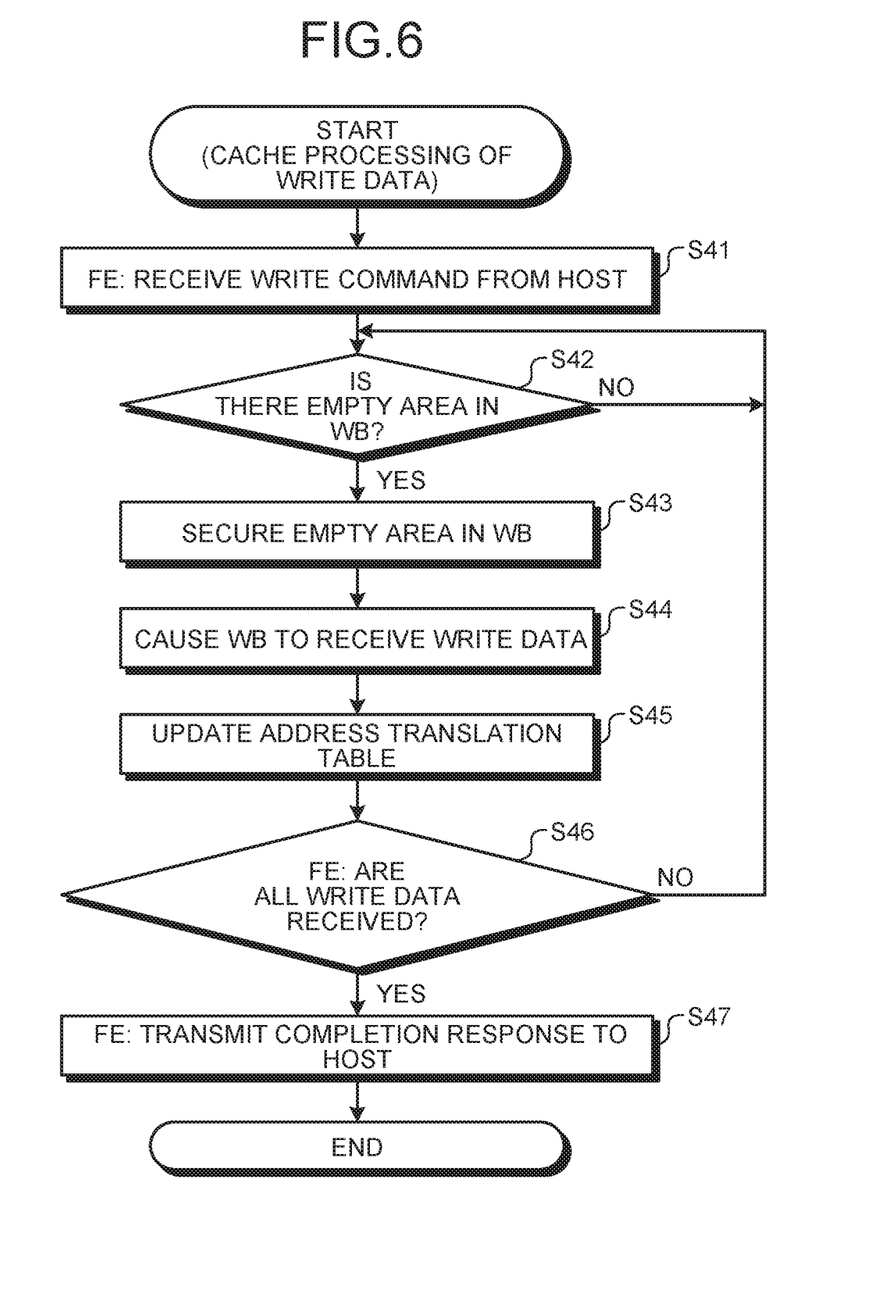
FIG. 6 is a flow chart illustrating a cache processing procedure of write data.

Cache processing of write data executed in the write buffer 26 will now be described. FIG. 6 is a flow chart illustrating a cache processing procedure of write data. The FE 10 receives a write command sent from the host 2 (step S41). Then, the FE 10 starts processing to receive write data sent from the host 2, in the WB 26.

At this time, the WC 22 determines whether there is an empty area (free space) in the WB 26 (step S42). In a case where an empty area is not found in the WB 26 (step S42, No), the WC 22 continues retrieval processing of an empty area. By the way, in a case where there isn't a sufficient empty area in the WB 26, the FE 10 temporarily stops reception of write data sent from the host 2. If an empty area is found in the WB 26 (step S42, Yes), the WC 22 secures an empty area in the WB 26 (step S43).

And the WC 22 transmits write data to the empty area in the WB 26. As a result, the WB 26 receives the write data (step S44) and stores the write data. The WC 22 updates an address translation table (step S45). The address translation table is a table indicating a correspondence relation between a logical address specified from the host 2 and an address in the WB 26.

The FE 10 determines whether all write data corresponding to the write command are received by the WB 26 (step S46). Unless all write data are received (step S46, No), the SSD 1 continues the reception processing of the write data. In other words, the processing of the steps S42 to S45 is executed in the SSD 1.

If all write data are received (step S46, Yes), the FE 10 transmits a completion response to the host 2 (step S47). All write data for which the completion response is transmitted to the host 2 are required to have persistence. Therefore, the SSD 1 non-volatilizes write data for which a write completion response is transmitted to the host 2, by using the NAND 7.

By the way, NAND elements included in the NAND 7 include two kinds: SLC (Single-level Cell) and MLC (Multiple-level Cell). In the SLC, data of one bit (two values) is recorded in one recording element. In the MLC, data of at least two bits (multiple values) is recorded in one recording element. And data writing into the SLC is faster in writing speed than data writing into the MLC.

When writing the write data or the like into the NAND 7, either a method of writing into the MLC via the SLC (SLC cache operation) or a method of writing directly into the MLC (MLC direct write operation) is used.

These SLC cache operation and MLC direct write operation are used properly to make a WAF (Write Amplification Factor) small. The WAF is a write magnification of write data from the host 2 to the NAND 7. Specifically, the WAF indicates what times write processing into the NAND 7 has occurred as compared with write data written from the host 2 into the write buffer 26. Therefore, it is desirable that the WAF is lower.

(SLC Cache Operation)

In a case where write data stored in the write buffer 26 is to be written into the NAND 7, the write data is first written into the SLC with two values (in a binary). In other words, in case of the SLC cache operation, host writing is first conducted with respect to an SLC block. Then, as for the write data written into the SLC block, compaction into an MLC block is conducted. In case of the SLC cache, the write data is written into the SLC once and reliability of the written write data is high.

In case of such an SLC cache operation, write processing that is high in localization contributes to lowering of the WAF of the MLC writing. This is because write processing that is high in localization has a high possibility of being overwritten in the SLC block (SLC cache).

On the other hand, in write processing that is low in localization (whole area random writing or sequential writing), the WAF becomes large by using the SLC cache operation. As a result, in the case of the SLC cache operation, write processing that is low in localization shortens a lifetime of the NAND elements, makes the bandwidth small, and increases power dissipation as compared with write processing that is high in localization.

(MLC Direct Write Operation)

In the case of the MLC direct write operation, write data stored in the write buffer 26 is written directly into the MLC in a multiple values. In other words, in the case of the MLC direct write operation, host writing is conducted directly into the MLC block. In the case of write processing that is low in localization, the MLC direct write operation lowers the WAF as compared with the SLC cache operation because there is no writing into the SLC. In a work load of an enterprise that is low in localization, therefore, the MLC direct write operation is advantageous as compared with the SLC cache operation to reduce the WAF.

In the NAND 7, for example, an MLC block used for MLC and an SLC block used for SLC are disposed. By the way, at the time of SLC cache operation, two values data may be written into the MLC.

In the SSD 1 in the present embodiment, the MLC direct write operation is conducted at the time of normal operation (steady state in which the external power supply 4 is supplied normally). Furthermore, in the SSD 1, data writing into the NAND 7 is conducted by two values writing at the time of PLP processing. Specifically, writing into the SLC is conducted at the time of processing of (st2) in FIG. 2. The writing into the SLC is shorter in program time than writing into the MLC. In a case where sudden power shut down has occurred, therefore, data writing into the NAND 7 can be conducted with a power quantity (energy) less than that at the time of normal operation, in the SSD 1.

At the time of next boot after the PLP processing, the SSD 1 restores write data written into the SLC block to the WB 26 as WB dirty, and then writes the write data into the MLC block. In other words, in a case where sudden power shut down has occurred, the SSD 1 conducts the SLC cache operation by using the emergency evacuation block 30.

As described above, the SSD 1 writes write data and the like into the emergency evacuation block 30, for example, only at the time of PLP processing. In this case, the WC 22 in the SSD 1 previously erases data in the emergency evacuation block 30 at the time of normal operation. Furthermore, in the SSD 1, the emergency evacuation block 30 may be used in common with a data write destination block used at the time of normal operation. In this case, the WC 22 selects blocks set in the emergency evacuation block 30 in order among from blocks in the NAND 7. In other words, blocks in the NAND 7 are set in the emergency evacuation block 30 according to a shift method. The SSD 1 does not write the write data into a block that is set in the emergency evacuation block 30, with two values at the time of normal operation.

Furthermore, at the time of the PLP processing, with respect to write data that is included in the WB dirty and that is insufficient for a predetermined size (for example, a cluster size which is a minimum unit of address translation), the SSD 1 may write the write data into the emergency evacuation block 30 without conducting padding processing (fill gap read processing) to obtain data corresponding to the cluster unit.

A minimum unit with which the host 2 can conduct write processing with respect to the SSD 1 is a first unit (sector). And in the SSD 1, management of the physical position or inputting/outputting of data in the NAND 7 is conducted by using a second unit (cluster or page) which is larger than the first unit.

In a case where write data sent from the host 2 is not lined up with the second unit or is insufficient for the second unit, therefore, in the normal operation, merging (coupling) of data is conducted to make the write data into the NAND 7 sufficient for the second unit.

Specifically, data of a deficiency of write data is read from the NAND 7 or the write buffer 26, and appropriation processing is conducted to satisfy the second unit with a total size of the data which is read and the write data from the host 2. In other words, in the padding processing, write data that is insufficient for the cluster unit is merged with data read from the NAND 7 or the like. As a result, write data that is insufficient for the cluster unit is made uniform with data of the cluster unit. And data made uniform with the cluster unit is written into the NAND 7.

In a case where the padding processing is not executed at the time of the PLP processing, it becomes unnecessary to read data from the NAND 7. As a result, it is possible to prevent error correction that is high in correction intensity (error correction that is long in correction processing time) from being executed at the time of PLP processing. In a case where padding processing is not executed at the time of the PLP processing, the SSD 1 executes padding processing when next boot.

Furthermore, at the time of the PLP processing, the SSD 1 may write meta data indicating the state of the write buffer 26 into the emergency evacuation block 30. In this case, the meta data is non-volatilized at timing similar to that of the WB dirty.

The meta data is data indicating a storage state of the write data stored in the write buffer 26. The meta data includes, for example, information concerning a range of a logical address of data received by the write buffer 26.

(Setting Example 1 of Meta Data)

The write buffer 26 is managed by the meta data with a third unit (for example, 4 kB which is a cluster unit) which is an integer times of the first unit (sector). The third unit is the same unit as the management unit of the LUT 21.

In the meta data, a logical address of received data is stored every third unit and a flag indicating whether there is data is stored every first unit. In other words, for example, a logical address of every cluster (for example, 4 kB interval) and a bit map (for example, 8 bits) indicating a fill gap state of every sector (for example 512 B) are stored in the meta data.

(Setting Example 2 of Meta Data)

Furthermore, the meta data may be created in the write buffer 26 as a set of sector data corresponding to the write command. In this case, in the meta data, a range of a logical address (a sector (for example, 512 B) interval) is defined every command, and the meta data becomes a set of these ranges. And if areas (ranges of logical address) overlap between commands, in the meta data these areas are merged (overwritten on newer data). The meta data that is set in the setting example 2 of meta data is higher in degree of abstraction than the meta data that is set in the setting example 1 of meta data.

Furthermore, the SSD 1 may write the management data in the BE 20 into the emergency evacuation block 30 at the time of the PLP processing. In this case, the management data is non-volatilized at timing similar to that of the WB dirty.

The management data is data used to manage the state of the SSD 1 (for example, information indicating the operation state and the like). Not only in a case where sudden power shut down has occurred, but also in a case where normal power shut down has occurred, the management data is non-volatilized as occasion demands. Management data that is written into the emergency evacuation block 30 at the time of the PLP processing is data that is not finished in non-volatilization and that needs non-volatilization.

Data that is included in the management data and that is desired to be non-volatilized when sudden power shut down has occurred is dirty data. In other words, dirty data in the management data is a portion that is non-volatilized at the time of the PLP processing after sudden power shut down has occurred.

Here, the management data will be described. The management data is non-volatilized by using, for example, a snap shot and a log. And the management table includes (1) an address translation table, (2) an effective data quantity counter, (3) a logical block configuration table, (4) a physical block management information, (5) a logical block management information, and (6) a logical block list.

(Snap Shot and Log)

The snap shot is obtained by storing all or a part of the state of the SSD 1 at a certain time point from among management data of volatile memory (DRAM or SRAM) (hereafter referred to as volatile memory X) in the controller 5 into the NAND 7. The log is obtained by storing one piece or a plurality of collected pieces of update information (difference) of an entry of management data in the volatile memory X when a change is made on the entry. For example, in a case where the snap shot is an address translation table, the log is an update difference of the address translation table. At the time of an unordinary power-off (power supply shut down), the SSD 1 writes at least a portion of the log where non-volatilization is not conducted into the emergency evacuation block 30 as dirty data with two values.

Management data lost from within the volatile memory X by power shut down can be restored by combining a snap shot at a certain time point and a log at that time point and later. Specifically, the latest snap shot stored before the power shut down is read into the volatile memory X. And update information included in a log group in a range from the snap shot that is read to the time of the power shut down is applied to the pertinent entry in a time series order. As a result, the pertinent entry at the time of the power shut down is obtained. In the present embodiment, a set of logs that are not yet non-volatilized is dirty data.

(1) Address Translation Table

The address translation table is a table used to translate a logical address instructed by the host 2 to a physical address in the NAND 7 where user data of the logical address is recorded. In other words, in the address translation table, a logical address specified by the host 2 and a physical address in the NAND 7 are associated with each other.

(1-1) Address Translation Table that is Not Hierarchical

A non-hierarchical address translation table is non-volatilized by the snap shot and the log. In the non-hierarchical address translation table, a log that is not yet non-volatilized is dirty data.

(1-2) Hierarchical Address Translation Table

The address translation table is usually read into the volatile memory X and used. In a case where the capacity of the SSD 1 is large, however, the address translation table also becomes large, and all of the address translation table cannot be read into the volatile memory X in some cases. Therefore, the address translation table is provided with a hierarchical structure, and all of a first level of hierarchy and a portion or all of a second level of hierarchy are read into the volatile memory X.

(1-2-1) Structure

The first level of hierarchy in the hierarchical address translation table indicates a correspondence relation between an upper portion of the logical address and a physical address in the NAND 7 where the second level of hierarchy in the hierarchical address translation table is recorded. In a case where the first level of hierarchy in the hierarchical address translation table is referred to, therefore, if an upper portion of the logical address is input, a physical address in the NAND 7 where the second level of hierarchy in the hierarchical address translation table is recorded is output.

The second level of hierarchy in the hierarchical address translation table indicates a correspondence relation between a lower portion of the logical address and a physical address in the NAND 7 where user data is recorded. In a case where the second level of hierarchy in the hierarchical address translation table is referred to, therefore, if a lower portion of the logical address is input, a physical address in the NAND 7 where the user data is recorded is output. Owing to such a configuration of the hierarchical address translation table, translation from a logical address to a physical address is conducted as a whole.

(1-2-2) Reference Method

Reference to the hierarchical address translation table is conducted with the following points. In a case where the second level of hierarchy in the hierarchical address translation table including an entry of reference target is not developed in the volatile memory X, the first level of hierarchy in the hierarchical address translation table is referred to (a). And a physical address on the NAND 7 of the second level of hierarchy in the hierarchical address translation table is acquired (b). The second level of hierarchy in the hierarchical address translation table is read from the physical address into the volatile memory X (c).

By the way, in a case where the second level of hierarchy is already developed into the volatile memory X, the above-described processing (a) to (c) is skipped. After the second level of hierarchy is read into the volatile memory X, in the SSD 1, an entry of reference target is referred to, and a desired physical address is acquired on the basis of the entry.

(1-2-3) Update and Non-Volatilization Method

Update and non-volatilization of the hierarchical address translation table are conducted with the following points. In a case where it is desired to update an entry including the hierarchical address translation table, if the second level of hierarchy in the address translation table including the entry of update target is not developed into the volatile memory X, development is conducted. This processing is processing similar to that in the above-described (a) to (c).

In the second level of hierarchy developed in the volatile memory X, an entry of update target is updated. Thereafter, the second level of hierarchy in which update has occurred is recorded is recorded in the NAND 7. By the way, this recording may not be conducted immediately after the update. After recording of the second level of hierarchy, a physical address in the NAND 7 is written in the pertinent entry in the first level of hierarchy on the volatile memory X (B).

By the way, the first level of hierarchy is non-volatilized by using the snap shot and the log. As the snap shot, the whole of the first level of hierarchy on the volatile memory X at a certain time point is written into the NAND 7. As the log, update (B) of one entry unit of the first level of hierarchy is written into the NAND 7.

(1-2-3) Dirty Data

Dirty data in the hierarchical address translation table is a set of the second level of hierarchy in which update has occurred but non-volatilization is not completed and a set of logs in the first level of hierarchy.

(2) Effective Data Quantity Counter (Effective Cluster Counter)

In order to conduct compaction efficiently, an effective data quantity (a quantity of data that is not overwritten) included in the pertinent logical block is counted every logical block described later. This count value is the effective data quantity counter. Since the counter group is comparatively small in data size, the counter group is stored, for example, by the snap shot at the time of PLP processing. Therefore, the effective data quantity counter corresponding to all logical blocks in the SSD 1 becomes dirty data. In other words, the whole of the effective data quantity counter becomes dirty data. By the way, the effective data quantity counter is especially high in update frequency, and consequently the effective data quantity counter is managed separately from logical block management information described later.

(3) Logical Block Configuration Table (L2P Table: Logical to Physical Table)

In order to improve performance of the SSD 1 and secure reliability of the SSD 1, a plurality of physical block groups capable of operating in parallel are collected as a set and managed as a logical block. The logical block configuration table indicates an address group of physical blocks included in each logical block. In other words, the logical block configuration table is information defining a set of a plurality of logical blocks.

The configuration of a logical block is rearranged due to, for example, occurrence of a faulty physical block in some cases. Therefore, the logical block configuration table is non-volatilized by the snap shot and log. Dirty data in the logical block configuration table is a set of logs in which update occurs but non-volatilization is not yet completed.

(4) Physical Block Management Information

The physical block management information is information indicating states of physical blocks and is defined every physical block. The physical block management information is non-volatilized by the snap shot and log. Dirty data in the physical block management information is a set of logs in which update occurs but non-volatilization is not yet completed.

(4-1) Faulty State

In the physical block management information, a faulty state indicating whether each physical block is a faulty block is managed. By the way, in the physical block management information, a faulty page group included in each physical block may be managed.

(4-2) Write Classification

Furthermore, the physical block management information includes write classification such as SLC/MLC/TLC (Triple-level Cell).

(4-3) Randomizer Key

When data is written into the NAND 7, randomizing (scrambling) is applied with the object of dissolving reliability lowering caused by offset of a bit pattern. A seed used in encode processing and decode processing at this time is a randomizer key, and a portion thereof is managed by the physical block management information.

(4-4) ECC Setting (Dynamic ECC)

In the SSD 1, an ECC having a different intensity is used depending upon reliability of every physical block. In the physical block management information, information concerning setting of an error correction intensity of every set of physical blocks is included. Specifically, setting of frame length and code rate of the ECC is included in the physical block management information.

(4-5) Read Voltage Threshold Setting

In the SSD 1, phenomena such as program disturb/read disturb/data retention occur depending upon exhaustion of the physical block and elapsed time after programming. The threshold distribution of the cell deviates from a regular threshold due to the phenomena in some cases. Therefore, a threshold to be used to read each physical block is set as a read voltage threshold. The read voltage threshold of each physical block is included in the physical block management information. By the way, information used to correct a deviation of the threshold may be the read voltage threshold itself or a deviation quantity from the original voltage.

(4-6) The Number of Times of Erasing

The number of times of erasing is the number of times each physical block was erased. The number of times of erasing of each block is included in the physical block management information.

(4-7) The Number of Times of Reading Counter

The number of times of reading counter is the number of times of reading conducted on the pertinent physical block since the physical block was programmed. The number of times of reading counter is used to estimate the state of advance of the read disturb. The number of times of reading counter is included in the physical block management information.

(4-8) The Number of Times of Error

The number of times of error is the number of times of erase error, the number of times of program error, and the like which have occurred in each physical block. The number of times of error is used as, for example, a measure of faulty block occurrence. The number of times of error is included in the physical block management information.

By the way, it is not necessary that all of the above-described faulty state, write classification, randomizer key, ECC setting, read voltage threshold setting, the number of times of erasing, the number of times of reading counter, and the number of times of error are included in the physical block management information. At least one of information kinds of (4-1) to (4-8) described above is included in the physical block management information.

(5) Logical Block Management Information

The logical block management information is information indicating a state and the like of a logical block, and is defined every logical block. The logical block management information is non-volatilized by the snap shot and log. Dirty data in the logical block management information is a set of logs in which update occurs but non-volatilization is not yet completed.

(5-1) Logical Block State

In the logical block state, it is indicated that each logical block is in which of states of already erased/in writing/after write completion/free (after compaction). The logical block state is included in the logical block management information.

(5-2) Logical Block Use

The logical block use indicates the use of the logical block is which of user data storage, address translation table storage, and other system data storage. The logical block use is included in the logical block management information.

(5-3) Write Completion Page Number

The write completion page number is a number of a page where writing is completed last in a logical block. The write completion page number is included in the logical block management information.

By the way, it is not necessary that all of the above-described logical block state, logical block use, and write completion page number are included in the logical block management information. At least one of the information kinds (5-1) to (5-3) described above is included in the logical block management information.

(7) Logical Block List

The logical block list is a list used to manage a set of logical blocks. The logical block list includes a list of logical blocks of user data after write completion, a list of logical blocks in the address translation table after write completion, and a list of free blocks.

Since the logical block list is comparatively small, the logical block list is stored by using the snap shot, for example, at the time of the PLP processing. Therefore, the whole of the logical block list becomes dirty data.

By the way, it is not necessary that all of the above-described (1) address translation table, (2) effective data quantity counter, (3) logical block configuration table, (4) physical block management information, (5) logical block management information, and (6) logical block list are included in the management data. At least one of the above-described information kinds (1) to (6) is included in the management data.

Figure 7:
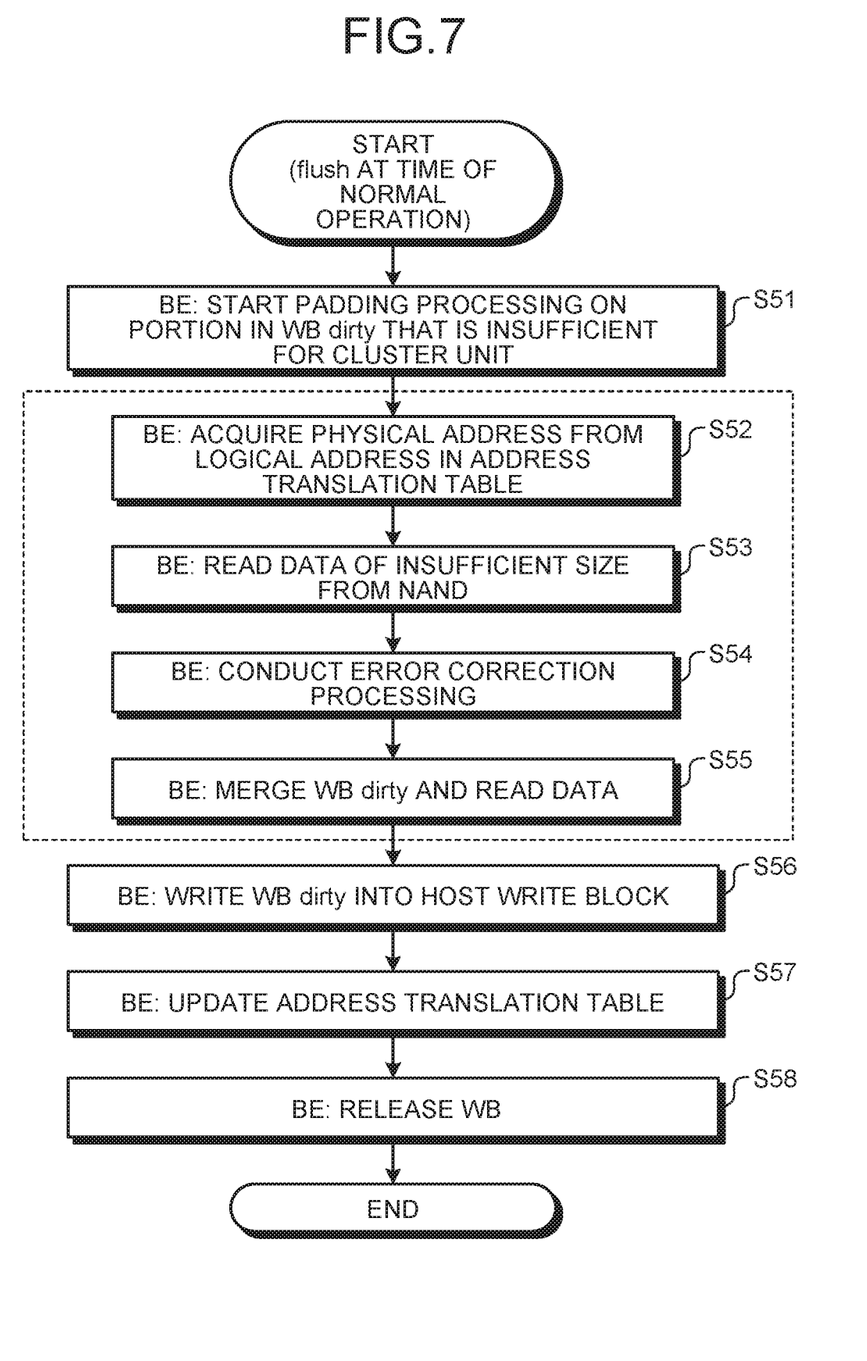
FIG. 7 is a flow chart illustrating a processing procedure of flush processing at the time of normal operation.

Flush processing of the WB dirty at the time of the normal operation will now be described. FIG. 7 is a flow chart illustrating a processing procedure of flush processing at the time of the normal operation. In FIG. 7, the flush processing procedure of WB dirty at the time of normal operation is illustrated.

Write data from the host 2 is written into the write buffer 26, and then written into the NAND 7. In this case, in the write buffer 26, an area in the write buffer 26 where data deletion is made possible by writing the write data into the NAND 7 is released. This release processing is flush processing.

At the time of the normal operation, the WC 22 in the BE 20 starts padding processing on a portion in the WB dirty that is insufficient for the cluster unit (step S51). And the WC 22 in the BE 20 refers to the address translation table and acquires a physical address from the logical address of the WB dirty (step S52). And the WC 22 in the BE 20 reads data of a deficiency size from the NAND 7 (step S53). Data of the deficiency size is data to be used to compensate for a size of a portion that is insufficient for the cluster unit. The size is determined depending upon the size of the portion that is insufficient for the cluster unit.

The ECC 23 in the BE 20 conducts error correction processing on the data of the deficiency size read from the NAND 7 (step S54). In addition, the WC 22 in the BE 20 merges the WB dirty that is insufficient for the cluster unit and data of the deficiency size read from the NAND 7 (step S55). In this way, the WB dirty that is insufficient for the cluster unit and data of the deficiency size are merged and united. As a result, data of cluster unit is generated.

Then, the WC 22 in the BE 20 writes the WB dirty after the merge into the host write block (step S56). At this time, the WB dirty is written into the NAND 7 in a multiple values. And in the BE 20, the address translation table is updated (step S57). In addition, in the BE 20, release of the write buffer 26 is conducted (step S58).

(In the Case of Normal Operation)

As described heretofore, the SSD 1 in the present embodiment executes the following processing as at least one cache operation and at least one host write operation at the time of the normal operation. In other words, in a case where the cache operation is conducted, the SSD 1 receives write data by using the write buffer 26 in response to a write command from the host 2. And upon completion of reception of write data corresponding to the write command, the SSD 1 returns a write completion response to the host 2 asynchronously with completion of writing the write data into the NAND 7. Furthermore, in a case where host write operation is conducted, the SSD 1 writes write data received from the host 2 by using the write buffer 26, into a block (host write block) on the NAND 7 assigned to host writing in a multiple values.

(In the Case of PLP Processing)

Furthermore, upon detecting stop of the external power supply 4 at the time of the PLP processing, the SSD 1 in the present embodiment conducts changeover to operation using the backup battery 40. And the SSD 1 writes data (WB dirty) that is included in data received from the host 2 by the write buffer 26 and that is not completed in writing into the host write block into the emergency evacuation block 30 with two values.

(In the Case of Activation)

Furthermore, at the time of the next boot after the PLP processing, the SSD 1 in the present embodiment reads the WB dirty in the emergency evacuation block 30 into the write buffer 26. And the SSD 1 writes the WB dirty in the write buffer 26 into the host write block on the NAND 7 in a multiple values by using power supplied from the external power supply 4. At this time, the SSD 1 may write the WB dirty in the write buffer 26 into a host write block different from the host write block used before the stop of the external power supply 4 is detected, in a multiple values. Owing to these kinds of processing, it becomes possible to store the WB dirty into the NAND 7 with low power even in a case where sudden power shut down has occurred.

Figure 8:
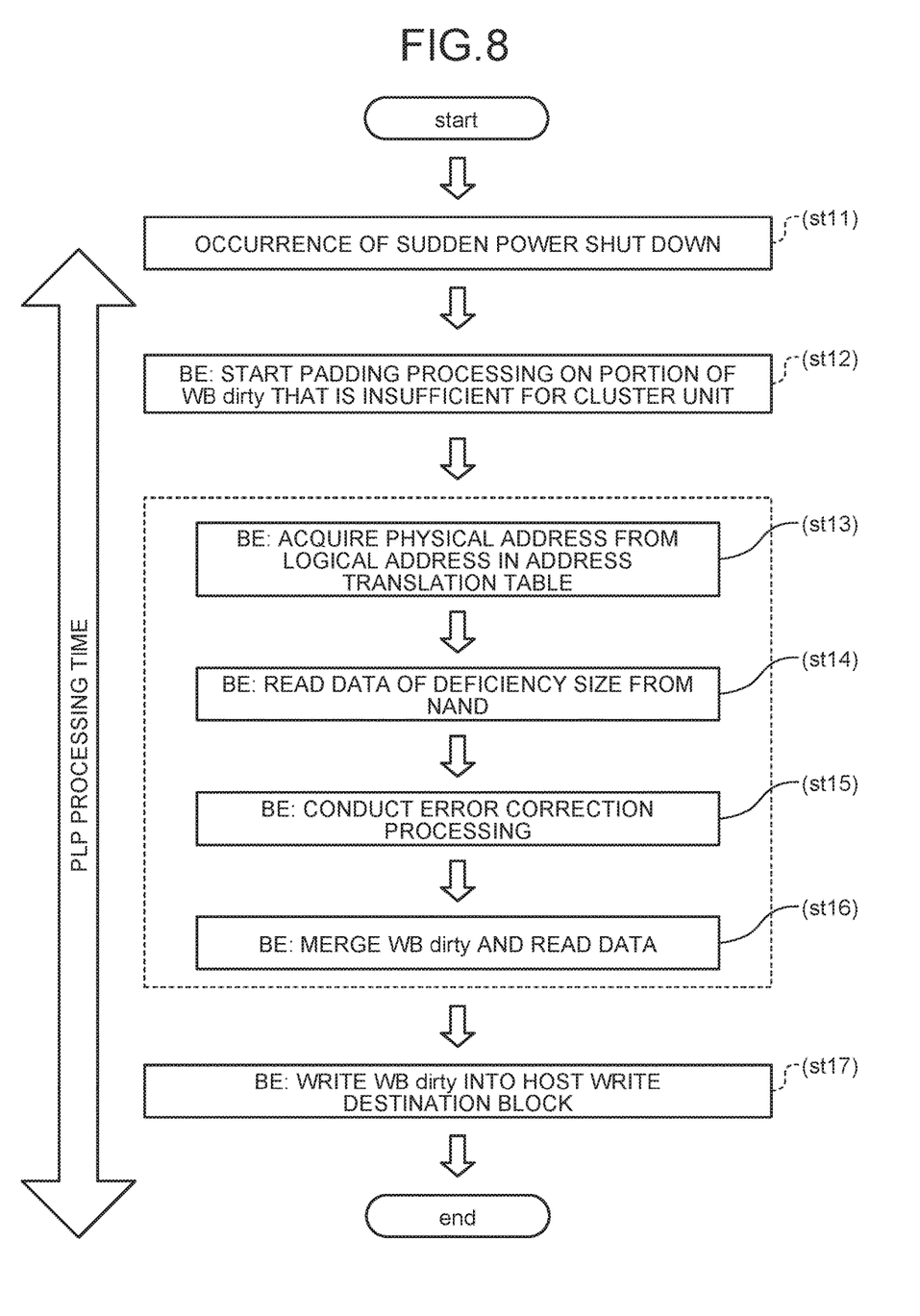
FIG. 8 is a flow chart illustrating a PLP processing procedure in a case where PLP processing is executed without using an emergency saving block.

Here, PLP processing that does not use the emergency evacuation block 30 will be described. FIG. 8 is a flow chart illustrating a PLP processing procedure in a case where PLP processing is executed without using the emergency saving block. With reference to FIG. 8, an operation processing procedure of the SSD 1 in a case where sudden power shut down has occurred will be described.

If sudden power shut down has occurred (st11), the BE 20 starts padding processing on a portion of the WB dirty that is insufficient for the cluster unit (st12). And the WC 22 in the BE 20 acquires a physical address from a logical address of the WB dirty in the address translation table (st13). In addition, the WC 22 in the BE 20 reads data of a deficiency size from within the NAND 7 (st14).

The ECC 23 in the BE 20 conducts error correction processing on the data of the deficiency size read from the NAND 7 (st15). In addition, the WC 22 in the BE 20 merges WB dirty which is insufficient for the cluster unit and data of the deficiency size read from the NAND 7 (st16). In this way, the WB dirty that is insufficient for the cluster unit and the data of the deficiency size are merged and united. As a result, data of the cluster unit is generated.

Then, in the BE 20, the WB dirty subjected to padding processing is written into the host write block in a multiple values (st17). As a result, non-volatilization of the WB dirty is conducted.

If padding processing is conducted on write data that is insufficient for the cluster unit and then the PLP processing is executed in this way, error correction processing is conducted on data of the deficiency size read from the NAND 7. If in this case error correction that is high in error correction intensity is executed, it takes a long time to conduct the PLP processing. The error correction that is high in error correction intensity is, for example, repeated correction processing (such as L3 correction) of a product code using an intra-page parity and an inter-page parity. In a case where error correction that is high in error correction intensity is executed, it becomes difficult to ensure a maximum time required to conduct the PLP processing.

Furthermore, when writing the WB dirty subjected to the padding processing into the host write block, if the WB dirty is written into the MLC in a multiple values, it takes a long time to program into the MLC. Furthermore, in PLP processing in the case where the emergency evacuation block 30 is not used, time from occurrence of sudden power shut down to non-volatilization of the WB dirty is PLP processing time. Therefore, the PLP processing in the case where the emergency evacuation block 30 is not used takes a longer time as compared with the PLP processing in the case where the emergency evacuation block 30 is used.

Figure 9:
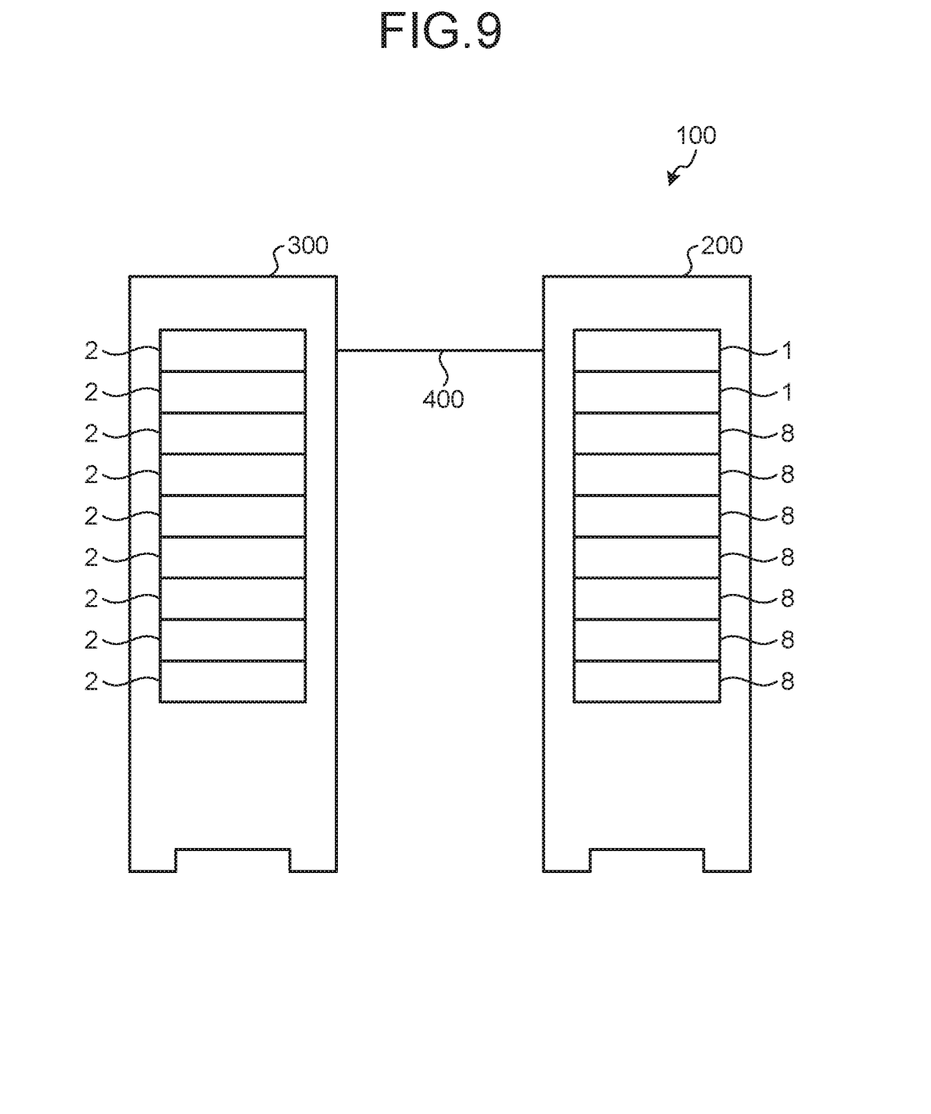
FIG. 9 is a diagram illustrating a mounting example of a memory system according to an embodiment.

A mounting example of the SSD 1 which is a memory system will now be described. FIG. 9 is a diagram illustrating a mounting example of a memory system according to an embodiment. The SSD 1 is mounted on a server system 100. The server system 100 includes a disk array 200 and a rack mount server 300 connected by a communication interface 400. As standards of the communication interface 400, arbitrary standards can be adopted. The rack mount server 300 includes at least one host 2 mounted on a server rack.

Furthermore, the disk array 200 includes at least one SSD 1 and at least one hard disk unit 8 mounted on a server rack. The disk array 200 includes a power supply which is not illustrated. Power from the power supply is supplied to units mounted on the disk array 200 via a back plane which is not illustrated.

By the way, in the disk array 200, for example, at least one memory system 1 is used as a cache of at least one hard disk unit. In the disk array 200, a storage controller unit constructing a RAID may be mounted on at least one hard disk unit 8.

By the way, the SSD 1 may conduct SLC cache operation at the time of the normal operation. Furthermore, the SSD 1 may execute MLC direct write operation when sudden power shut down has occurred. Furthermore, when sudden power shut down has occurred, the SSD 1 may write the write data into the NAND 7 with two values without using the emergency evacuation block 30. In this case, the SSD 1 may write the write data and the management data collectively into the NAND 7, or may write the write data and the meta data collectively into the NAND 7.

Furthermore, in a case where sudden power shut down has occurred, the SSD 1 is not restricted to writing the WB dirty into the emergency evacuation block 30 with two values, but the SSD 1 may conduct writing by using any method as long as writing into the emergency evacuation block 30 can be conducted with lower power as compared with the normal operation.

Furthermore, the SSD 1 may conduct data writing into the host write block with two values until the charging quantity of the backup battery 40 reaches a predetermined quantity since power supply from the external power supply 4 to the SSD 1 is turned on.

Furthermore, when sudden power shut down has occurred, the SSD 1 may non-volatilize the write data by conducting two values data writing into a block that is subject to multiple values writing at the time of normal operation. In this case, a write page written with two values is additionally recorded (post-scripted) to the block that is subject to multiple values writing at the time of normal operation.

Furthermore, data written into the emergency evacuation block 30 at the time of PLP processing is not restricted to WB dirty, the management data, and the meta data, but may be other saving data. Furthermore, the memory system is not restricted to the SSD 1, but may be another device such as a HDD (Hard Disk Drive).

In the embodiment, write data is written into the NAND 7 in a multiple values at the time of the normal operation in this way. Furthermore, when sudden power shut down has occurred, the WB dirty is written into the emergency evacuation block 30 with two values. In addition, at the time of next boot, the WB dirty is read from the emergency evacuation block 30 into the write buffer 26, and the WB dirty in the write buffer 26 is written into the NAND 7 in a multiple values.

When sudden power shut down has occurred, therefore, the WB dirty is written into the emergency evacuation block 30 with lower power as compared with the time of the normal operation. As a result, the SSD 1 can non-volatilize the WB dirty with low power while ensuring the PLP requirements. Therefore, the battery quantity stored in the backup battery 40 can be reduced. Consequently, the backup battery 40 can be made small. Accordingly, the cost of the backup battery 40 can be held down and the size of the SSD 1 can be made small.

Furthermore, since the WB dirty is non-volatilized by two values writing that is faster as compared with the time of the normal operation, the WB dirty can be non-volatilized in a short time. Therefore, the backup battery 40 can be made further small.

Furthermore, writing into the emergency evacuation block 30 is conducted without conducting padding processing on write data that is included in the WB dirty and that is insufficient for the cluster unit. Accordingly, the WB dirty can be non-volatilized in a short time. Therefore, the backup battery can be made further small.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory;
a controller circuit configured to receive a write command from a host and control the nonvolatile memory; and
a power control circuit including a battery, the battery being configured to store power supplied from an external supply, the power control circuit being configured to supply, to a component of the memory system, at least one of the power supplied from the external supply and the power stored in the battery, wherein,
if a completion response for the write command has not been returned to the host in a case where the power becomes unsupplied from the external supply, the controller circuit aborts, using the power stored in the battery, the write command received from the host.

2. The memory system according to claim 1, wherein,
in the case where the power becomes unsupplied from the external supply, the controller circuit further stops accepting a write command from the host.

3. The memory system according to claim 1, further comprising:
a buffer, wherein,
in the case where the power becomes unsupplied from the external supply, the controller circuit further writes first write data stored in the buffer into the nonvolatile memory using the power stored in the battery, the first write data being data related to a write command received from the host and for which a completion response has been returned to the host.

4. The memory system according to claim 3, wherein
the nonvolatile memory includes a memory cell, and
the controller circuit writes the first write data into the nonvolatile memory so that the memory cell into which at least a part of the first write data is written records only one bit.

5. The memory system according to claim 3, wherein
the controller circuit is further configured to conduct address translation from a logical address specified by the host to a physical address in the nonvolatile memory corresponding to the logical address, and,
when the first write data has a size that is less than a minimum unit in which the address translation is conducted, the controller circuit writes the first write data into the nonvolatile memory without conducting a padding process, the padding process being a process in which the first write data is padded with second write data stored in the nonvolatile memory.

6. The memory system according to claim 3, wherein,
upon a start-up of the memory system after the controller circuit has written the first write data into the nonvolatile memory, the controller circuit reads the first write data from the nonvolatile memory using the power supplied from the external supply, and writes third write data into the nonvolatile memory using the power supplied from the external supply, the third write data being the first write data read from the nonvolatile memory.

7. The memory system according to claim 6, wherein
the nonvolatile memory includes a memory cell, and
the controller circuit writes the third write data into the nonvolatile memory so that the memory cell into which at least a part of the third write data is written records more than one bit.

8. The memory system according to claim 6, wherein
the nonvolatile memory includes blocks, each of the blocks being a unit of erasing, and
the controller circuit writes the third write data into a block that is different from a block in which the first write data is stored.

9. The memory system according to claim 1, wherein
the battery is composed of a capacitor.

10. The memory system according to claim 1, wherein,
in the case where the power becomes unsupplied from the external supply, the controller circuit aborts the write command when a charge level of the battery is less than a first threshold.

11. A method of controlling a memory system, the memory system including:
a nonvolatile memory;
a controller circuit; and
a power control circuit including a battery, the battery being configured to store power supplied from an external supply, the power control circuit being configured to supply at least one of the power supplied from the external supply and the power stored in the battery to a component of the memory system,
the method executed using the controller circuit, comprising:
if a completion response for a write command has not been returned to a host in a case where the power becomes unsupplied from the external supply, aborting, using the power stored in the battery, the write command received from the host.

12. The method according to claim 11, further comprising:
in the case where the power becomes unsupplied from the external supply, stopping accepting a write command from the host.

13. The method according to claim 11, wherein
the memory system further includes a buffer, and
the method further comprises:
in the case where the power becomes unsupplied from the external supply, writing first write data stored in the buffer into the nonvolatile memory using the power stored in the battery the first write data being data related to a write command received from the host and for which a completion response has been returned to the host.

14. The method according to claim 13, wherein
the nonvolatile memory includes a memory cell, and
the method further comprises:
writing the first write data into the nonvolatile memory so that the memory cell into which at least a part of the first write data is written records only one bit.

15. The method according to claim 13, further comprising:
conducting address translation from a logical address specified by the host to a physical address in the nonvolatile memory corresponding to the logical address; and,
when the first write data has a size that is less than a minimum unit in which the address translation is conducted, writing the first write data into the nonvolatile memory without conducting a padding process, the padding process being a process in which the first write data is padded with second write data stored in the nonvolatile memory.

16. The method according to claim 13, further comprising:
upon a start-up of the memory system after having written the first write data into the nonvolatile memory, reading the first write data from the nonvolatile memory using the power supplied from the external supply, and writing third write data into the nonvolatile memory using the power supplied from the external supply, the third write data being the first write data read from the nonvolatile memory.

17. The method according to claim 16, wherein
the nonvolatile memory includes a memory cell, and
the method further comprises:
writing the third write data into the nonvolatile memory so that the memory cell into which at least a part of the third write data is written records more than one bit.

18. The method according to claim 16, wherein
the nonvolatile memory includes blocks, each of the blocks being a unit of erasing, and
the method further comprises:
writing the third write data into a block that is different from a block in which the first write data is stored.

19. The method according to claim 11, wherein
the battery is composed of a capacitor.

20. The method according to claim 11, further comprising:
in the case where the power becomes unsupplied from the external supply, aborting the write command when a charge level of the battery is less than a first threshold.

* * * * *